United States Patent
Otsuji et al.

(10) Patent No.: US 6,813,799 B2
(45) Date of Patent: Nov. 9, 2004

(54) CLEANING ARTICLE

(75) Inventors: Kazuya Otsuji, Haga-gun (JP); Nobuya Sato, Haga-gun (JP)

(73) Assignee: Kao Corporation, Tokyo (JP)

(*) Notice: Subject to any disclaimer, the term of this patent is extended or adjusted under 35 U.S.C. 154(b) by 149 days.

(21) Appl. No.: 09/758,156

(22) Filed: Jan. 12, 2001

(65) Prior Publication Data

US 2001/0007162 A1 Jul. 12, 2001

(30) Foreign Application Priority Data

Jan. 12, 2000 (JP) ........................................ 2000-003537
Dec. 25, 2000 (JP) ........................................ 2000-392166

(51) Int. Cl.⁷ .......................... A47L 13/16; A47L 25/08
(52) U.S. Cl. ........................... 15/209.1; 15/208; 15/231; 15/104.001; 428/85; 428/95
(58) Field of Search ...................... 15/209.1, 104.001, 15/231, 208, 223, 210.1, 244.3, 244.4, 244.1; 428/85, 95, 412, 411.01, 171

(56) References Cited

U.S. PATENT DOCUMENTS 3,754,991 A * 8/1973 Amos et al. .................... 134/4
5,525,397 A * 6/1996 Shizuno et al. ............. 428/138
5,569,521 A   10/1996 Francoeur, Sr. et al.
6,270,875 B1 * 8/2001 Nissing ....................... 428/138

FOREIGN PATENT DOCUMENTS

| EP | 0931869 A | 7/1999 |
| GB | 2200380 A | 8/1988 |
| JP | 2000008259 | 1/2000 |
| WO | WO9700001 A | 1/1997 |

OTHER PUBLICATIONS

Dictionary.com, The American Heritage Dictionary of the English Language, 2000, Houghton Mifflin Company, Fourth Edition.*

* cited by examiner

Primary Examiner—Robert J. Warden, Sr.
Assistant Examiner—S Balsis
(74) Attorney, Agent, or Firm—Birch, Stewart, Kolasch & Birch, LLP

(57) ABSTRACT

A cleaning article comprising an elastomer sheet having a synthetic elastomer disposed on the surface thereof as a cleaning surface, wherein the elastomer sheet has a maximum static frictional force of 9.8 to 29 N. With the cleaning article, a carpet, etc. can easily be cleared of pet hair, etc. clinging thereto.

6 Claims, 3 Drawing Sheets

CLEANING ARTICLE

BACKGROUND OF THE INVENTION

The present invention relates to a cleaning article, the cleaning surface of which is rubbed over a surface to be cleaned to remove pet hair, human hair, etc.

Pet hair, human hair, etc. heavily clinging to a carpet or a rug are not easy to remove even by vacuuming.

A cleaning article having a tacky substance on its cleaning side is known. The cleaning article of this type is applied to a carpet to catch and remove hairs, etc. clinging thereto by making use of the tackiness of the cleaning side. Since the tack of the cleaning side decreases in repeated use, the sheet must be renewed frequently. Frequent renewal is against resources saving.

A cleaning article of block form made of foamed natural rubber, the natural rubber serving as a cleaning surface, is also known. This article (hereinafter referred to as a natural rubber article) is wiped over a carpet to catch pet hair, etc. clinging to the carpet by making use of the greater frictional force between the cleaning surface and the hairs than that between the hairs and the carpet.

The natural rubber article has the following disadvantages however. The natural rubber of the cleaning surface is apt to peel because of low rubbing resistance. Because the pet hair, etc. removed from a carpet, etc. adhere to the cleaning surface by static electricity, they then have to be removed from the cleaning surface. Because natural rubber has extremely low light resistance, the natural rubber article gradually reduces the frictional coefficient with exposure to light. As a result, the frictional force between the cleaning surface and pet hair, etc. reduces, and the ability to catch pet hair, etc. is weakened. If the natural rubber article is washed and dried in the sun, the natural rubber of the cleaning surface peels. When dried in the shade to prevent peeling, the article takes much time to dry. Thus, the natural rubber article is unsuited to repeated use.

SUMMARY OF THE INVENTION

An object of the present invention is to provide a cleaning article with which extraneous matter clinging to an object of cleaning, such as pet hair clinging to a carpet, can be removed easily and which is suitable for repeated use.

The present invention accomplishes the above object by providing a cleaning article comprising an elastomer sheet having a synthetic elastomer disposed on the surface thereof, the synthetic elastomer forming a cleaning surface, wherein the elastomer sheet has a maximum static frictional force of 9.8 to 29 N. The static frictional force is a frictional force required for moving a 1 kg weight having a flat rectangular base of 50 mm by 75 mm and having the elastomer sheet stuck to the entire surface of the base on a horizontally spread polypropylene carpet having cut piles 7 mm in length at a density of a 1/10 gauge and 43 stitches/10 cm in the direction of the longer side of the base.

BRIEF DESCRIPTION OF THE DRAWINGS

The present invention will be more particularly described with reference to the accompanying drawings, in which:

FIG. 1 shows a cleaning article according to a first embodiment of the present invention, in which

FIG. 3 shows a cleaning article according to a third embodiment of the present invention, in which

DETAILED DESCRIPTION OF THE PREFERRED EMBODIMENTS

The cleaning article of the present invention will be illustrated in detail with particular reference to its preferred embodiments by way of the accompanying drawings.

Figure 1A:
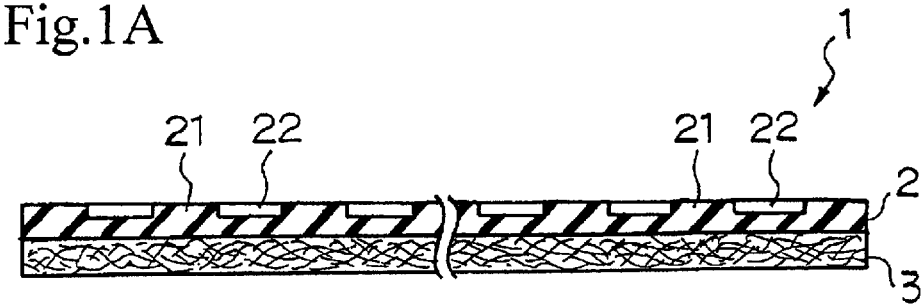
FIG. 1A is a cross section of an elastomer sheet taken along a line passing through projections and depressions of the elastomer sheet.

The cleaning article of a first preferred embodiment comprises an elastomer sheet 1 having a synthetic elastomer 2 disposed on the surface thereof as shown in FIG. 1A. The synthetic elastomer 2 serves as a cleaning surface. The elastomer sheet 1 has a maximum static frictional force of 9.8 to 29 N, preferably 15 to 26 N, still preferably 18 to 23 N.

The maximum static frictional force is measured as follows. A weight weighing 1 kg whose base is a 50 mm wide and 75 mm long rectangle is used. An elastomer sheet is stuck to the entire base surface of the weight with double-sided adhesive tape Nicetac available from Nichiban Co., Ltd. The weight with its base covered with the elastomer sheet is put on a horizontally spread carpet with the elastomer sheet in contact with the carpet. The carpet has 7 mm long cut piles made of polypropylene at a pile density of 1/10 gauge and 43 stitches/10 cm. Such a carpet is commercially available from Suminoe Textile Co., Ltd. under a trade name Suminoe Tile Carpet US-3000, which was used in Examples hereinafter given. The weight placed on the carpet is horizontally moved in the direction of the longer side (75 mm side) of the base at a speed of 3 m/min, and the maximum force required is measured. The measurement is repeated 3 times, and an average is taken as a maximum static frictional force.

As shown in FIG. 1A, the elastomer sheet 1 according to the first embodiment has a laminate structure comprising a support 3 of sheet form made of nonwoven fabric and a synthetic elastomer 2 made, e.g, of a urethane elastomer. The synthetic elastomer 2 is a sheet having a plurality of projections 21 and depressions 22 arranged in rows and lines in its plan view. Such a configuration can be obtained by, for example, laminating the support 3 with the synthetic elastomer 2 by means of an embossing roll having projections and depressions. The projections 21 and the depressions 22 formed in the synthetic elastomer 2 prevent the blocking of the synthetic elastomer 2, and enable effective collection and removal of fatty dirt such as sebum from the carpet.

In the case where the projections 21 and the depressions 22 are formed in the synthetic elastomer 2, the ratio of the area of the projections 21 and that of the depressions 22 (the former/the latter) is preferably 10/90 to 50/50, more preferably 15/85 to 30/70 in view of the improvement in anti-blocking and collection and removal of fatty dirt.

The depressions 22 may be discontinuous shape for example circle, polygon such as triangle and rectangular or a combination thereof with regular or irregular arrangement.

Alternatively, the depressions 22 may be continuous shape for example straight line, curved line or a combination thereof with regular or irregular arrangement. In the case where the depressions 22 are discontinuous shape, the area of the individual depression 22 is preferably 0.01 to 1 mm$^2$, more preferably 0.05 to 0.5 mm$^2$ in view of the improvement in anti-blocking. The distance between adjacent depressions 22 is preferably 0.01 to 4 mm, more preferably 0.05 to 2 mm in view of the improvement in anti-blocking and the effective use of the surface of the synthetic elastomer 2.

The nonwoven fabric making the support 3 preferably includes nonwoven fabrics made of polyolefin fibers, polyester fibers, polyamide fibers or mixed fibers thereof by a spun bonding method or spun lacing method. From the standpoint of ease of handling and shapability in conformity to a hand, the nonwoven fabric preferably has a basis weight of 10 to 100 g/m$^2$, particularly 20 to 70 g/m$^2$.

The synthetic elastomer which can be used in the invention is not limited to urethane elastomers and includes styrene elastomers, olefin elastomers, vinyl chloride elastomers, ester elastomers, amide elastomers, and mixtures of two or more thereof. Urethane elastomers are particularly preferred for their friction resistance.

From the viewpoint of processability, economy, and handling properties, it is preferred for the synthetic elastomer to have a basis weight of 10 to 200 g/m$^2$, particularly 20 to 150 g/m$^2$.

Figure 1B:
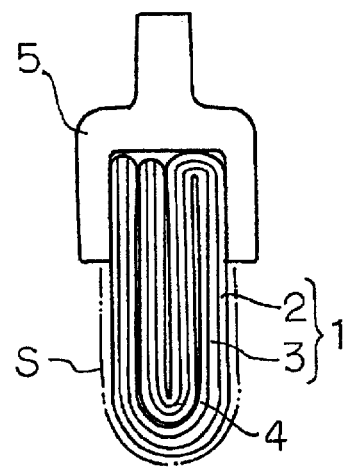
FIG. 1B is a side view illustrating a manner of using the cleaning article.

The cleaning article of the first embodiment can be used, for example, as depicted in FIG. 1B. That is, a cushioning material 4 made of a urethane resin is adhered to the support 3 of the elastomer sheet 1 to make the elastomer sheet moderately stiff, and the sheet is folded into four with the synthetic elastomer 2 outside. The folded sheet is fixed into a holding member 5. The exposed area of the synthetic elastomer 2 in this folded state, i.e., the area indicated by the two-dotted broken line in FIG. 1B, forms a cleaning surface S.

In using the cleaning article of the first embodiment in the above-described ready-to-use state, the holding member 5 is grasped in a hand to give a carpet rubs with the cleaning surface S, whereby the carpet can be cleared of pet hair, etc. because the frictional force between the synthetic elastomer 2 and the pet hair, etc. is greater than that between the carpet and the hair, etc.

The pet hair, etc. thus rubbed off the carpet get entangled with each other into an aggregate. Since no static electricity is generated, the hairs do not cling to the synthetic elastomer 2 nor re-cling to the carpet. Further, having high friction resistance, the synthetic elastomer 2 does not peel.

The cleaning article of the present embodiment can be washed and dried for repeated use. Having sufficient sunlight resistance, the synthetic elastomer 2 does not peel even if dried in the sun. Since the cleaning surface S of the synthetic elastomer 2 has projections and depressions, a rub with it on a carpet not only removes hairs but wipes fatty dirt such as sebum off the carpet at the edges of the projections 21. Further, when the synthetic elastomers 2 are brought into contact with each other by, for example, folding, they do not stick to each other because of the surface unevenness which reduces the contact area thereby to reduce the adhesive force between them.

A second embodiment of the cleaning article according to the present invention has the same structure as the first embodiment except for the configuration of the synthetic elastomer. In what follows, the cleaning article of the second embodiment is described only with respect to the part different from the first embodiment.

Figure 2:
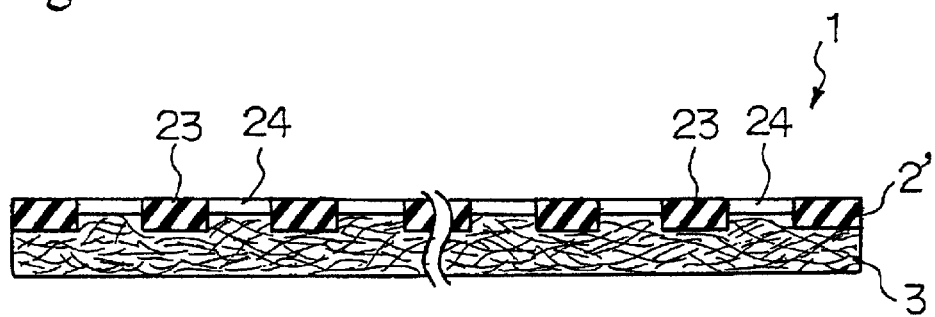
FIG. 2 is a cross section of the elastomer sheet of a cleaning article according to a second embodiment of the present invention, taken along a line passing through perforations.

The elastomer sheet 1 according to the second embodiment has a laminate structure comprising a support 3 of sheet form made of nonwoven fabric and a synthetic elastomer 2'. The synthetic elastomer 2' is a perforated sheet having perforations 24 and non-perforated portions 23 arranged in rows and lines in its plan view as shown in FIG. 2. Such a configuration can be obtained by, for example, laminating the support 3 with the synthetic elastomer 2' by means of a suction roll having suction holes while sucking the synthetic elastomer 2' through the suction holes. The perforations 24 and the non-perforated portions 23 enable the absorption of the liquid dirt present in the carpet into the support 3 made of nonwoven fabric through the perforations 24 formed in the synthetic elastomer 2'. The absorption of the liquid dirt present in the carpet and the retention thereof can be enhanced by use of nonwoven fabric comprising absorptive materials such as rayon.

In the case where the perforations 24 and the non-perforated portions 23 are formed in the synthetic elastomer 2, the ratio of the area of non-perforated portions 23 and that of perforations 24 (the former/the latter) is preferably 10/90 to 50/50, more preferably 15/85 to 30/70 in view of the improvement in anti-blocking and collection and removal of fatty dirt.

The perforations 24 may be discontinuous shape for example circle, polygon such as triangle and rectangular or a combination thereof with regular or irregular arrangement. Alternatively, the perforations 24 may be continuous shape for example straight line, curved line or a combination thereof with regular or irregular arrangement. In the case where the perforations 24 are discontinuous shape, the area of the individual perforations 24 is preferably 0.01 to 1 mm$^2$, more preferably 0.05 to 0.5 mm$^2$ in view of the improvement in anti-blocking. The distance between adjacent perforations 24 is preferably 0.01 to 4 mm, more preferably 0.05 to 2 mm in view of the improvement in anti-blocking and the effectvie use of the surface of the synthetic elastomer 2.

In preferred usage, the cleaning article according to the second embodiment can be made into a read-to-use state in the same manner as in the first embodiment to produce the same effects. That is, it is combined with a cushioning material, folded, and fitted into a holding member.

Figure 3A:
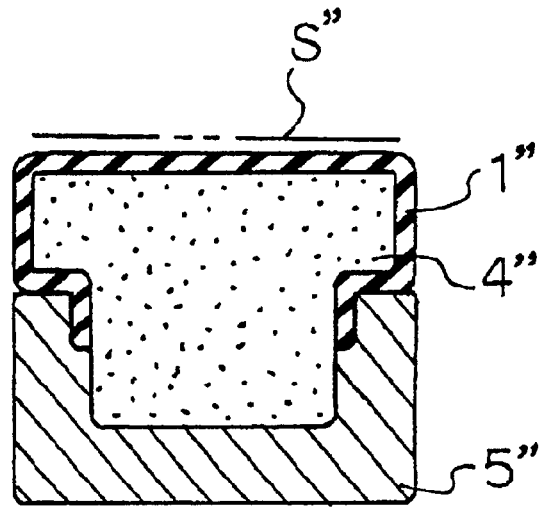
FIG. 3A is a cross section of a cushioning material covered with an elastomer sheet and fitted into a holding member.
Figure 3B:
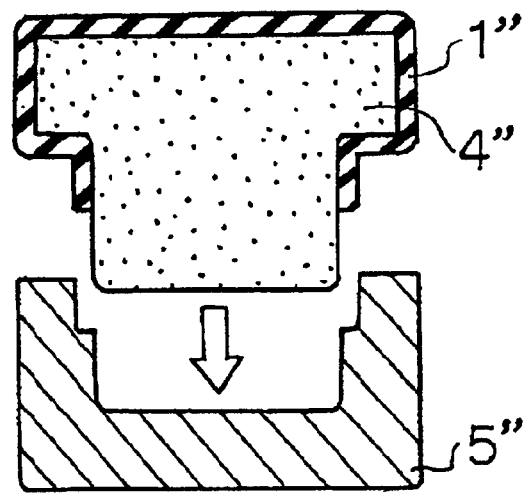
FIG. 3B is a cross section of the cushioning material covered with the elastomer sheet and the holding member before fitting together.

A third embodiment of the cleaning article according to the present invention comprises a cushioning material 4" having a projection, an elastomer sheet 1" provided on part of the surface of the cushioning material 4", and a holding member 5" having a depression into which the projection of the cushioning material 4" is fitted as shown in FIGS. 3A and 3B. That is, the cleaning article of the third embodiment has, in addition to the elastomer sheet 1", the holding member 5" having a depression and the cushioning material 4" having a projection which is to be fitted into the depression. The elastomer sheet 1" is attached to part of the cushioning material 4" fitted into the depression with its synthetic elastomer outside. Part of the elastomer sheet 1", i.e., the area indicated by the two-dotted broken line in FIG. 3A acts as a cleaning surface S". While different in structure from the first and second embodiments, the cleaning article of the third embodiment can be used in the same manner to produce the same effects as in the foregoing embodiments.

In this embodiment, the elastomer sheet 1" can combine the function as the cushioning material 4". In this case, there is no need to separately prepare the cushioning material 4".

The cleaning article of the present invention is by no means limited to the aforementioned embodiments, and various modifications can be made as long as the elastomer sheet has a synthetic elastomer on its surface so that the synthetic elastomer may serve as a cleaning surface. For example, the whole cleaning article may be made up of a synthetic elastomer. Where the cleaning article comprises a support of sheet form having thereon a synthetic elastomer, it can be produced by any appropriate method other than laminating.

Figure 4:
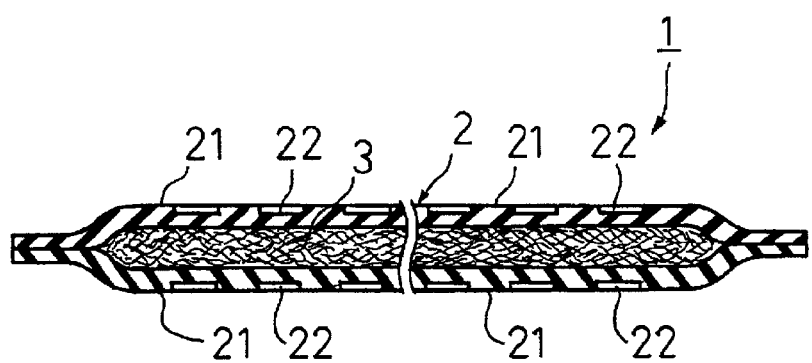
FIG. 4 is a cross section of the cleaning article according to a fourth embodiment of the present invention.

The cleaning article of the present invention may comprise, as shown in FIG. 4, the support 3 and the synthetic elastomers 2, 2 provided on each side of the support 3. In this embodiment, both surface of the article 1 serve as the cleaning surface. The maximum static frictional force may be the same or different between the two synthetic elastomers 2, 2. The projections 21 and the depressions 22 may be formed in one or both surface of the article 1. Alternatively, the perforations (not shown) may be formed in one or both surface of the article 1. In this embodiment, in the case where the support 3 comprises nonwoven fabric, the basis weight thereof is preferably 100 to 400 g/m$^2$, more preferably 200 to 300 g/m$^2$.

The synthetic elastomer can have an appropriate configuration other than the projections/depressions form and the perforation form as far as its surface can produce the contemplated effects of the present invention. For example, even a synthetic elastomer having a smooth surface can produce effects in its own way. The support is not limited to nonwoven fabric, and a film made of a synthetic resin, etc. will also do.

The above-described usage of the cleaning article according to the first and second embodiments is illustrative of how it could be used with user's convenience being taken into consideration. Therefore, the cleaning article may be used in other ways. For example, the elastomer sheet may be folded several times into an appropriate size and held directly in a hand for cleaning.

While the present invention has been described with particular reference to a carpet as an object of cleaning and to pet hair as an object to be rubbed off, the application of the cleaning article is not limited to these objects. For example, the cleaning article is also effective in removing human hair from chairs and settees upholstered in fabrics, bedclothes, and the like.

The present invention will now be illustrated in greater detail with reference to Examples, which are presented as being exemplary of the present invention and should not be construed as limiting.

EXAMPLE 1

A polyester spun-bond nonwoven fabric having a basis weight of 50 g/m$^2$ (Estas (ester), available from Asahi Chemical Industry Co., Ltd.) was laminated with 30 g/m$^2$ of a thermoplastic urethane elastomer (E660MZAA, available from Nippon Miractran K. K.; specific gravity: 1.13; hardness: 60A (JIS A)) by extrusion lamination at a die temperature of 180° C. to prepare a cleaning article. The maximum static frictional force of the cleaning article was found to be 24.5 N. In the measurement of the maximum static frictional force, Suminoe Tile Carpet US-3000 supplied from Suminoe Textile Co., Ltd. was used as a carpet (hereinafter the same).

A Saint Bernard's hairs weighing 0.050 g were scattered on the same carpet as used above within an area of about 20 cm by about 20 cm and rubbed so as to cling to the piles. That area was given three double rubs with the cleaning article, and the hairs collected into aggregates were harvested and weighed. The harvested hairs weighed 0.045.

EXAMPLE 2

A spun-bond nonwoven nylon fabric having a basis weight of 30 g/m$^2$ (Estas (nylon) available from Asahi Chemical Industry Co., Ltd.) was laminated with 15 g/m$^2$ of a thermoplastic urethane elastomer (E660MNAT, available from Nippon Miractran K.K.; specific gravity: 1.14; hardness: 63A (JIS A)) by extrusion lamination at a die temperature of 180° C. to prepare a cleaning article. The maximum static frictional force of the cleaning article was found to be 27.4 N. The amount of hairs measured in the same manner as in Example 1 was 0.046 g.

EXAMPLE 3

A spun-lace nonwoven polyester web having a basis weight of 40 g/m$^2$ (Sontara, available from E. I. de Pont) was laminated with 30 g/m$^2$ of the same thermoplastic urethane elastomer as used in Example 1 by extrusion lamination at a die temperature of 180° C. to prepare a cleaning article. The maximum static frictional force of the cleaning article was found to be 25.5 N. The amount of hairs measured in the same manner as in Example 1 was 0.045 g.

EXAMPLE 4

The same non-woven fabric as used in Example 1 was laminated with the same thermoplastic urethane elastomer as used in Example 1 while chilling the thermoplastic elastomer layer with an embossing roll having a dot pattern to make the elastomer layer uneven to prepare a cleaning article. The dot pattern of the embossing roll had a pitch of 2.1 mm, a repeat of 1.4 mm, a depth of 0.42 mm, and a dot diameter of 0.36 mm. Other laminating conditions are the same as in Example 1. The maximum static frictional force of the cleaning article was found to be 19.6 N. The amount of hairs measured in the same manner as in Example 1 was 0.049 g.

EXAMPLE 5

A cleaning article was prepared in the same manner as in Example 4, except that the dot pattern of the embossing roll had a pitch of 5.6 mm, a repeat of 5.8 mm, a depth of 0.7 mm, and a dot diameter of 0.7 mm. The maximum static frictional force of the cleaning article was found to be 22.5 N. The amount of hairs measured in the same manner as in Example 1 was 0.048 g.

EXAMPLE 6

The same non-woven fabric as used in Example 1 exceprt for the basis weight thereof (300 g/m$^2$) was laminated with the same thermoplastic urethane elastomer as used in Example 1 on each side of the non-woven fabric while chilling the thermoplastic elastomer layer with an embossing roll having a dot pattern to make the elastomer layer uneven to prepare a cleaning article. The dot pattern of the embossing roll had a pitch of 2.1 mm, a repeat of 1.4 mm, a depth of 0.42 mm, and a dot diameter of 0.36 mm. Other laminating conditions are the same as in Example 1. The maximum static frictional force of the cleaning article in each surface was found to be 24.5 N.

COMPARATIVE EXAMPLE 1

A cleaning article was prepared in the same manner as in Example 1, except for using polyvinylidene chloride (Saran Wrap, available from Asahi Chemical Industry Co., Ltd.) in place of the urethane elastomer. The maximum static frictional force of the cleaning article was found to be 2.0 N. The amount of hairs measured in the same manner as in Example 1 was 0.006 g.

COMPARATIVE EXAMPLE 2

A cleaning article was prepared in the same manner as in Example 2, except for using a thermoplastic polyolefin elastomer (Milastomer 5030N, available from Mitui Kagaku K.K.) in place of the urethane elastomer. The maximum static frictional force of the cleaning article was found to be 7.8 N. The amount of hairs measured in the same manner as in Example 1 was 0.020 g.

COMPARATIVE EXAMPLE 3

A cleaning article sold under the trade name GONZO PET HAIR LIFTER supplied by Gonzo Co., was tested for rub resistance as follows. This cleaning article has a block form, and its cleaning surface is made of natural rubber. The maximum static frictional force of the cleaning article was 24.0 N. The same rub resistance test was carried out on the cleaning article of Example 2.

Rub Resistance Test-1:

A Saint Bernard's hairs weighing 0.05 g were scattered on the same carpet as used in the measurement of a maximum static frictional force within an area of about 20 cm by about 20 cm and rubbed so as to cling to the piles. That area was rubbed with the cleaning article with a load of about 2 kg applied to the cleaning article until the hairs got entangled into aggregates or removed from the carpet. The test was repeated five times, and an average number of rubs given was obtained as a number of rubs for complete cleaning.

Rub Resistance Test-2:

The same carpet as used in the measurement of a maximum static frictional force was rubbed with the cleaning article under a load of about 2 kg until the cleaning surface of the article was broken. The test was repeated five times to obtain an average number of rubs to break.

As a result, the cleaning article sold under the trade name GONZO PET HAIR LIFTER needed 5.0 rubs for complete cleaning and 6 rubs until break. On the other hand, the cleaning article of Example 2 needed 2.5 rubs for complete cleaning and 60 rubs until break. It is seen from these results that the cleaning article of the present invention is resistant against rubbing frictional and withstands long-term use.

As described above, the present invention provides a cleaning article with which extraneous matter, such as pet hair clinging to an object, such as a carpet, can be removed easily without causing the matter to re-cling to the object and which can be repeatedly washed and dried for repeated use with no problem.

While the invention has been described in detail and with reference to specific examples thereof, it will be obvious that the same may be varied in many ways. Such variations are not to be regarded as a departure from the spirit and scope of the invention, and all such modifications as would be obvious to one skilled in the art are intended to the included within the scope of the following claims.

What is claimed is:

1. A cleaning article comprising an elastomer sheet having a synthetic elastomer forming a cleaning surface, wherein said elastomer sheet has a maximum static frictional force of 9.8 to 29 N, said static frictional force being defined as that frictional force required for moving a 1 kg test weight having a flat rectangular base having a shorter side of 50 mm and a longer side of 75 mm and having said elastomer sheet stuck to the entire surface of said base of said test weight wherein movement of said test weight occurs on a horizontally disposed polypropylene carpet having cut piles 7 mm in length at a density of a 1/10 gauge and 43 stitches/10 cm wherein the movement of the test weight is in the direction parallel to that of the longer side of said base wherein the cleaning surface of the cleaning article is smooth and flat and is free of depressions wherein any hairs which contact the cleaning surface of the cleaning article get entangled with each other into an aggregate and do not cling to the cleaning surface which further comprises a support laminated with said elastomer sheet which cleaning article further comprises a cushioning material, wherein said cushioning material is adhered to said support, thereby forming a composite planar structure which is folded with said synthetic elastomer outwardly facing.

2. A cleaning article comprising an elastomer sheet having a synthetic elastomer forming a cleaning surface, wherein said elastomer sheet has a maximum static frictional force of 9.8 to 29 N, said static frictional force being defined as that frictional force required for moving a 1 kg test weight having a flat rectangular base having a shorter side of 50 mm and a longer side of 75 mm and having said elastomer sheet stuck to the entire surface of said base of said test weight wherein movement of said test weight occurs on a horizontally disposed polypropylene carpet having cut piles 7 mm in length at a density of a 1/10 gauge and 43 stitches/10 cm wherein the movement of the test weight is in the direction parallel to that of the longer side of said base wherein the cleaning surface of the cleaning article is smooth and flat and is free of depressions wherein any hairs which contact the cleaning surface of the cleaning article get entangled with each other into an aggregate and do not cling to the cleaning surface which cleaning article further comprises a holding member having a depression and a cushioning material having a projection to be fitted into said depression, wherein said elastomer sheet is attached to part of the surface of said cushioning material to form a cleaning surface with said synthetic elastomer outside on fitting said cushioning material into said holding member.

3. The cleaning article according to claim 1 or 2, wherein said synthetic elastomer has projections on the surface thereof.

4. The cleaning article according to claim 1 or 2, wherein said support comprises nonwoven fabric or a film.

5. The cleaning article according to claim 1 or 2, wherein said synthetic elastomer is selected from the group consisting of: an urethane elastomer, a styrene elastomer, an olefin elastomer, a vinyl chloride elastomer, an ester elastomer, an amide elastomer and mixtures thereof.

6. The cleaning article according to claim 1 or 2, wherein said synthetic elastomer has perforations.

* * * * *